United States Patent [19]
Yamashita et al.

[11] 4,039,871
[45] Aug. 2, 1977

[54] COOLING DEVICE FOR USE IN A LOW INERTIA ELECTRIC MOTOR

[75] Inventors: Seizi Yamashita; Kazuo Onishi, both of Hitachi, Japan

[73] Assignee: Hitachi, Ltd., Japan

[21] Appl. No.: 621,768

[22] Filed: Oct. 14, 1975

[30] Foreign Application Priority Data

Oct. 16, 1974  Japan .............................. 49-118171

[51] Int. Cl.² .......................................... H02K 9/00
[52] U.S. Cl. ...................................... 310/59; 310/154
[58] Field of Search ...................... 310/60, 58, 59, 64, 310/266, 53, 52, 154, 55, 57, 56, 65

[56] References Cited

U.S. PATENT DOCUMENTS

| 2,338,593 | 1/1944 | Mortensen | 310/55 |
|---|---|---|---|
| 2,492,753 | 12/1949 | Linville | 310/56 |
| 3,250,933 | 5/1966 | Edick | 310/60 |
| 3,588,556 | 6/1971 | Guzman | 310/58 |
| 3,665,230 | 5/1972 | Wallenstein | 310/60 |
| 3,831,045 | 8/1974 | Anisimov | 310/58 |
| 3,906,265 | 9/1975 | Giles | 310/55 |

*Primary Examiner*—R. Skudy
*Attorney, Agent, or Firm*—Craig & Antonelli

[57] ABSTRACT

A cooling device for use in a low inertia electric motor, in which there are provided a plurality of main passages for cooling air, around the outer circumferential surface of a cylindrical armature which surface is surrounded by magnetic pole pieces with gaps left therebetween. The main passages extend in the axial direction of the armature, so that cooling air is introduced under pressure from the ends of the aforesaid main passages on one side and then discharged from the other ends of the main passages, so as to cool the outer circumferential surface of the armature. At least half of those main passages are of such an arrangement that the cross sectional areas of the main passages are gradually varied from inlets of the main passages towards the outlets thereof, respectively so that a circumferential flow of air through said gaps is created.

11 Claims, 5 Drawing Figures

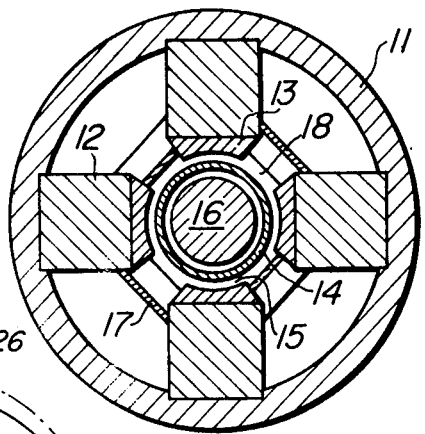
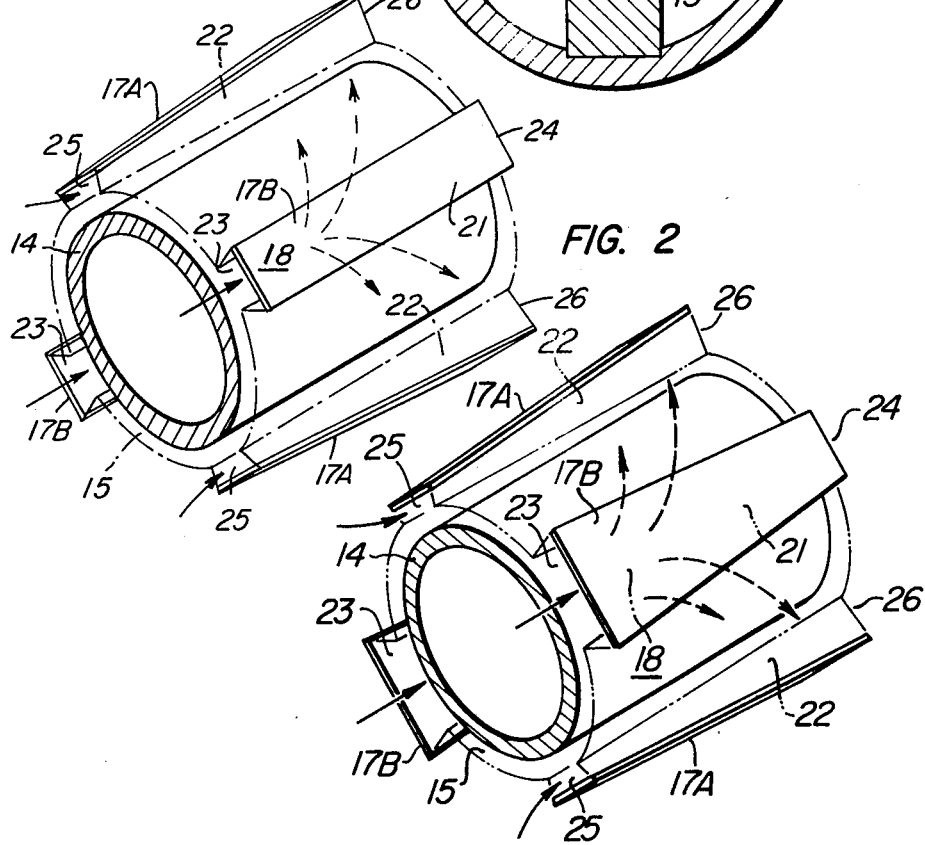

COOLING DEVICE FOR USE IN A LOW INERTIA ELECTRIC MOTOR

BACKGROUND OF THE INVENTION

1. Field of the Invention

This invention relates to a low inertia electric motor, and more particularly to a cooling device for use in a low inertia electric motor having an elongated, cylindrical armature.

2. Description of the Prior Art

Electric motors having cylindrical armatures find a wide use as drive sources for capstans of magnetic tape devices, because of their large torque-inertia ratios.

The low inertia electric motors used as drive sources for magnetic tape devices appear to leave no room for improvements in moment of inertia and gap magnetic flux density.

For instance, with an electric motor driving a tape travelling at a speed of 200 inch/sec, the moment of inertia of a rotor including a capstan is found to be about 18 g.cm$^2$, while the gap magnetic flux density is about 17,000 gauss, which is quite close to the saturated magnetic density of an inner iron core disposed within te cylindrical armature.

In addition, the rated torque required for an electric motor is on the order of 10 kg.cm. For achieving the aforesaid requirement, the density of a current flowing through an armature conductor should be about 90 A/mm$^2$ in terms of the conversion factor of copper wire. In addition, it has been a common practice that a vacuum blower for cooling an electric motor is used in common with the magnetic tape device, so that there may not be achieved a satisfactory cooling effect for the electric motor.

With a low inertia electric motor having a cylindrical armature of the type described, armature windings serving as a sole heat generating source are molded with resin or the like, and are so designed as to rotate, without contacting the iron core or the like, leaving a gap therebetween.

In general, it follows that there is no heat transfer from the armature to the iron core in such an electric motor, while most of the heat from the armature is dissipated into the cooling air, when the cooling air is used.

Accordingly, the allowable heating value of the armature, i.e., the allowable current is largely dependent on the path along which the cooling air flows for cooling the armature of the type described.

The prior art cooling device for an electric motor of this type is of such an arrangement that magnets are equally spaced on the inner circumferential surface of a housing, with magnetic pole pieces secured to the tips of magnets.

In addition, an armature of a cylindrical shape is rotatively supported on a shaft, with a gap left between the armature and the inner end faces of the magnetic pole pieces.

Thus, the magnetic fluxes run through the aforesaid magnets towards the cylindrical armature in intersecting relation thereto, thereby imparting rotation to the armature.

The above cylindrical armature may be of such an arrangement that the effective conductor portion of formed coils are arranged in parallel in the axial direction in the form of a cylinder, or may be of a printed wiring armature.

More particularly, according to the prior art electric motor, there are provided guides for passing the cooling air, between the adjoining magnetic pole pieces, so that cooling air which has been introduced from one end of the armature, as viewed in the axial direction of the armature, may be guided towards the outer circumferential surface of the armature. In addition, there are provided partition walls on the other end of the armature for blocking the cooling air from the spaces defined between adjoining magnets, so that when air is introduced under suction from one end of the armature by means of a vacuum blower, then there is produced an air pressure within the electric motor in the axial direction, with the result that cooling air flows through gaps between the armature and the magnetic pole pieces as well as through spaces between the adjoining magnetic pole pieces. Accordingly, the cooling air receives heat from the surface of the armature serving as a heat generating source, thereby cooling the armature.

Another known attempt is such that there are provided in the axial direction a plurality of fins on the guides for cooling air, which fins run in the radial direction of the guides, in an attempt to turn a laminar flow of air into a turbulent flow for enhancing the cooling effect. A still another known attempt such as disclosed in U.S. Pat. No. 3,588,556, is such that there are provided a plurality of high-pressure chambers and low-pressure chambers between the magnetic pole pieces of an electric motor, with the ends of the aforesaid chambers on one side being sealed, whereby pressurized cooling air is introduced into the aforesaid chambers in a manner to flow through a gap defined between the outer circumferential surface of an armature and the tip surfaces of magnets, in concentric relation to and in parallel with the circumferential surface of the armature for cooling same.

However, those attempts suffer from shortcomings in that the flow of cooling air is limited only to part of the outer circumferential surface of the armature or air flows only in one axial direction or in one circumferential direction, so that there may not result desired cooling of the outer circumferential surface of the armature, thus failing to provide low inertia electric motor having a high performance, due to the aforesaid insufficient cooling.

SUMMARY OF THE INVENTION

Accordingly, the present invention is directed to avoiding the foresaid shortcomings experienced with the prior art cooling devices.

It is an object of the present invention to provide a high performance electric motor, in which cooling air is so designed as to flow along the outer circumferential surface of an armature through gaps defined between the armature and the tips of magnetic pole pieces, for the purposes of enhancing cooling effect as well as increasing the allowable current for the armature.

According to the present invention, there is provided a cooling device for use in a low inertia electric motor, characterized in that there are provided a plurality of main passages for cooling air, between the adjoining magnetic pole pieces which are equally spaced around the outer circumferential surface of the cylindrical armature, and at least half of the aforesaid main passages are of such an arrangement that the cross sectional areas thereof are gradually varied in the axial direction, so that there may be achieved cooling air streams running both in the axial direction and in the circumferential direction, although cooling air eventually flow in the axial direction from one end of each of the main passages to another.

BRIEF DESCRIPTION OF THE DRAWINGS

FIG. 1 is a cross-sectional view of one embodiment of the cooling device according to the present invention, taken along the line positioned on the inlet side of the main passage;

FIG. 2 is a perspective view illustrative of main passages for the cooling air;

FIG. 5 is a perspective view similar to FIG. 2 illustrating another arangement of main passages.

DESCRIPTION OF THE PREFERRED EMBODIMENTS

Figure 3:
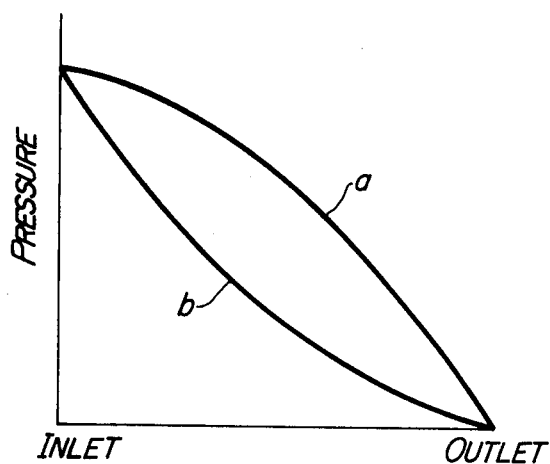
FIG. 3 is a graph showing the pressure gradients of cooling air on the inlet and outlet sides of the main passage.

These and other objects and features of the present invention will be apparent from a reading of the ensuing part of the specification in conjunction with the accompanying drawings which indicate an embodiment of the present invention.

As has been described, FIG. 1 shows a cross sectional view of the cooling device according to the present invention. A plurality of magnets 12 are secured to the inner circumferential surface of a housing 11 at an equal spacing, with the tips of magnets 12 having magnetic pole pieces 13. Shown at 14 is a cylindrical armature which is radially spaced a minute distance from the magnetic pole pieces 13 to provide gaps 15 therebetween, and rotatively supported. An inner iron core 16 is fixedly placed within the cylindrical armature, with a gap left therebetween.

Shown in 17 are guide plates which interconnect the adjoining magnetic pole pieces 13 and define main passages 18 for the cooling air which is to flow along the outer circumferential surface of the armature 14.

As shown in FIG. 2, a main passage 21 for the cooling air is defined by a guide plate 17B and magnetic pole pieces not shown but defined by the dot and dash lines, with its cross sectional areas being gradually decreased in the axial direction from its inlet 23 towards its outlet 24, while a main passage 22 is defined by a guide plate 17A and magnetic pole pieces not shown, with its cross sectional areas being gradually increased. Such main passages 21 having gradually decreasing cross sectional areas and main passages 22 having gradually increasing cross sectional areas are placed alternately around the outer circumferential surface of the armature 14.

With the aforesaid arrangement, when cooling air is introduced under pressure from the inlets 23, 25 of the main passages 21, 22 then part of the cooling air in the main passages 21 flow through gap 15 between the magnetic pole pieces 13 and the armature 14, into the adjoining main passages 22 having gradually increasing cross sectional areas, because of a pressure difference therebetween, subsequently described, as shown by arrows in FIG. 2, after which the cooling air is discharged through the outlets 24, 26 positioned on the opposite side. As a result, the heat is sufficiently dissipated from the surface of the armature 14 into the cooling air.

Since the aforesaid main passages 21 have cross sectional areas which are gradually decreased from the inlet 23 towards the outlet 24, while the passages 22 have cross sectional areas which are gradually increased from their inlet 25 towards their outlet 26, there results a difference between pressure gradient $a$ (FIG. 3) in the main passage 21 having gradually decreasing cross sectional areas and pressure gradient $b$ in the main passages 22 having gradually increasing cross sectional areas. Accordingly, due to the aforesaid difference in gradient, the cooling air is caused to flow through the gap 15 defined between the armature 14 and the magnetic pole pieces 13, thereby cooling the armature 14.

Figure 4:
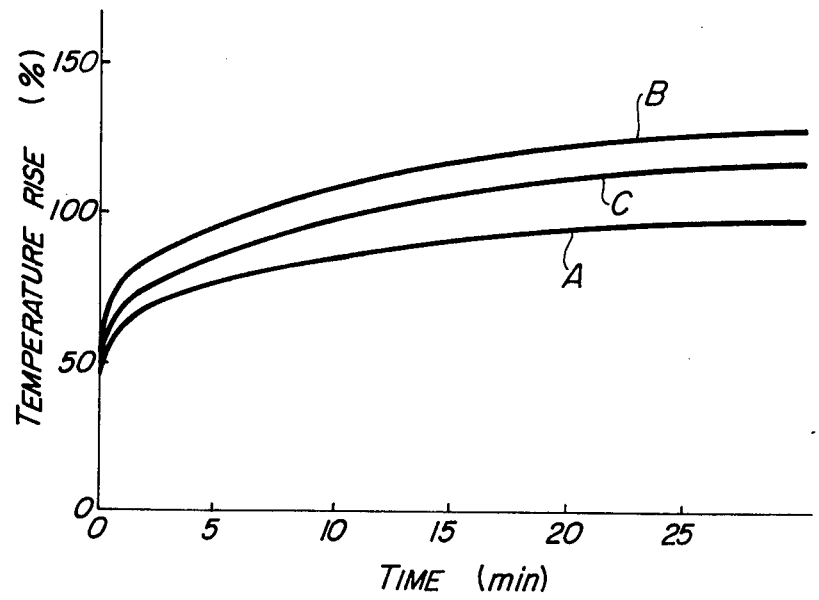
FIG. 4 is a graph showing temperature rises in an armature for comparison purpose.

The test results obtained well reflect the cooling effect of the cooling device according to the present invention, as shown in FIG. 4. FIG. 4 shows average temperature rises in conductors of the armature 14. In this figure, a curve A represents the temperature rise according to the cooling device of the invention, a curve B represents the temperature rise in the prior art cooling device, in which the cooling air flows in one axial direction, and a curve C shows the improvements over the aforesaid prior art cooling device, in which there are provided sealed high-pressure chambers and low pressure chambers. As can be best seen from this figure, the temperature rise (curve A) is considerably lower, as compared with the curves B and C.

While description has been given thus far of the case where the main passages having gradually decreasing cross sectional areas and the main passages having gradually increasing cross sectional areas are arranged alternately. Alternatively, however, either one of the aforesaid two type main passages may be provided as those which have a constant cross sectional area as shown in FIG. 5 with guide plate 17B' forming passages of constant cross sectional area.

As is apparent from the foregoing description of the cooling according to the present invention, cooling air flows in the axial direction from one end to another through the respective main passages, thereby cooling the outer circumferential surface of the armature, which is radially spaced at a distance from the magnetic pole pieces, while part of the cooling air flows through gaps defined by the outer circumferential surface of the armature and the adjoining magnetic poles, into the main passage having gradually increasing cross sectional areas. Accordingly, the cooling air may cool the entire surface of the armature, with the resulting improved cooling effect. This in turn increases the heating value of the armature and hence the allowable current for windings of the armature, presenting an electric motor of high performance.

What is claimed is:

1. A cooling device for use in a low inertia electric motor, comprising:
   an armature extending in the axial direction and rotatively supported;
   means for supporting magnetic pole pieces which are radially spaced a minute distance from the outer circumferential surface of said armature, said magnetic pole pieces being placed at an equal spacing to each other around the aforesaid outer circumferential surface of said armature; and
   a plurality of main passages for the cooling air formed in the spaces between adjoining magnetic pieces and in the vicinity of the circumferential surface of the armature, at least half of said main passages having cross sectional areas which are gradually varied in the axial directions of said passages.

2. A cooling device as set forth in claim 1, wherein a group of the aforesaid plurality of main passages have their cross sectional areas which are gradually decreased from their inlet sides to their outlet sides, while the other group of said main passages have cross sectional areas which are gradually increased, as viewed in the same direction as in the aforesaid one group of main passages, said two different groups of main passages are disposed alternately around the outer circumferential surface of said armature.

3. A cooling device as set forth in claim 2, wherein one group of said main passages have a constant cross sectional area throughout their length.

4. A cooling device set forth in claim 1, wherein each of the plurality of main passages have an inlet for cooling air proximate to one end of the motor and an outlet for the cooling air proximate to another end of the motor with the air flow through the main passages being in the direction from the inlet to the outlet thereof.

5. A cooling device as set forth in claim 4, wherein said armature is a cylindrical armature having a core member centrally disposed and spaced from an inner circumferential surface thereof.

6. A cooling device as set forth in claim 5, wherein a plate member is provided between adjoining magnetic pieces in the spaces therebetween and extends in the axial direction of the motor for delimiting at least a portion of the main passages, at least half of the plate members being spaced from the outer circumferential surface of said armature at varying radial distances between the inlet and outlets of said main passages.

7. A cooling device for a low inertia electric motor, comprising:
a cylindrical armature extending in the axial direction and rotatably supported;
means for supporting a plurality of magnetic pole pieces radially spaced a minute distance from the outer circumferential surface of said armature, said magnetic pole pieces being arranged at an equal spacing from each other around the outer circumferential surface of said armature; and
a plurality of main passage means for cooling air in the spaces between adjacent magnetic pole pieces and in the vicinity of the circumferential surface of said armature, at least half of said main passage means having cross sectional areas which gradually vary in the axial direction for enabling cooling air to flow from an inlet proximate to one end of the motor to an outlet proximate to another end of the electric motor in both the axial direction and circumferentially about the outer circumferential surface of the armature for providing improved cooling of said armature.

8. A cooling device as set forth in claim 7, wherein one group of said plurality of main passage means have cross sectional areas which gradually decrease from the inlet to the outlet and another group of the plurality of main passage means with cross sectional areas which gradually increase from the inlet to the outlet, respective ones of said one and another groups of main passage means being alternately disposed around the outer circumferential surface of said armature.

9. A cooling device as set forth in claim 7, wherein one group of the plurality of main passage means have cross sectional areas which vary from the inlet to the outlet and another group with constant cross sectional areas from the inlet to the outlet, respective ones of said one and another groups of main passage means being alternately disposed around the outer circumferential surface of said armature.

10. A cooling device as set forth in claim 7, further comprising a core member centrally disposed with respect to said cylindrical armature and radially spaced from the inner circumferential surface of said armature.

11. A cooling device set forth in claim 10, wherein said main passage means includes a plate member extending in the axial direction between adjacent magnetic pole pieces, at least half of said plate members being radially spaced at varying distances from the outer circumferential surface of said armature between the inlet and outlet of said main passage means.

* * * * *